United States Patent [19]

Gordy et al.

[11] 4,280,218
[45] Jul. 21, 1981

[54] FALSE ALARM PROCESSOR

[75] Inventors: Robert S. Gordy, Williamsville, N.Y.; Billy R. Poston; David E. Sanders, both of St. Petersburg, Fla.

[73] Assignee: E-Systems, Inc., Dallas, Tex.

[21] Appl. No.: 64,845

[22] Filed: Aug. 8, 1979

[51] Int. Cl.³ .................... H04B 15/00; G06F 11/00
[52] U.S. Cl. ........................... 371/6; 328/165; 375/34; 455/296
[58] Field of Search ............ 371/6; 375/34, 99, 102; 455/296; 343/17.1 R, 5 DP; 328/115, 116, 165

[56] References Cited

U.S. PATENT DOCUMENTS

| | | | |
|---|---|---|---|
| 3,286,257 | 11/1966 | Trafford et al. | 343/17.1 R |
| 3,374,479 | 3/1968 | Moore | 343/7 |
| 3,386,079 | 5/1968 | Wiggins | 371/6 |
| 3,566,088 | 2/1971 | Crook | 364/819 |
| 3,617,998 | 11/1971 | Freedman | 340/5 R |
| 3,680,106 | 7/1972 | Foley | 343/18 E |
| 3,689,922 | 9/1972 | Phillips, Jr. | 343/17.1 R |
| 3,701,149 | 10/1972 | Patton et al. | 343/5 DP |
| 3,701,154 | 10/1972 | McKinney | 343/18 E |
| 3,729,737 | 4/1973 | Asam | 343/7.3 |
| 3,737,790 | 6/1973 | Brown | 328/165 |
| 3,797,014 | 3/1974 | Tompkins et al. | 343/5 DP |
| 3,829,858 | 8/1974 | Bergkvist | 343/7 A |
| 3,875,569 | 4/1975 | Hill et al. | 343/5 DP |
| 4,013,998 | 3/1977 | Buccaiarelli et al. | 340/146.2 |
| 4,123,709 | 10/1978 | Dodds et al. | 375/34 |
| 4,156,229 | 5/1979 | Shawhan | 371/6 |

Primary Examiner—Charles E. Atkinson
Attorney, Agent, or Firm—Robert V. Wilder; Albert M. Crowder, Jr.

[57] ABSTRACT

Improved acquisition of signals in a Gaussian noise environment is achieved by applying the output of a correlator (14) to a threshold detector (12). A correlation pulse output from the threshold detector (12) and the output of the correlator (14) are input to a false alarm processor (10) that includes multiple correlation checking channels (22). Each correlation checking channel (22) is assigned to sample an input at various points over a selected interval by an enable pulse generated at the output of select logic (30). Each correlation checking channel (22) includes correlation check enable logic (34), a blanking generator (36), and a confirmation logic (42). In the confirmation logic (42) samples of the analog input are taken at discrete times and integrated over a preselected number of intervals. If this integrated value exceeds a threshold level during the integration interval, the analog input signal is considered valid and a "signal confirmed" pulse is generated and gated through a gate NAND (44) onto a signal confirm line 28.

18 Claims, 10 Drawing Figures

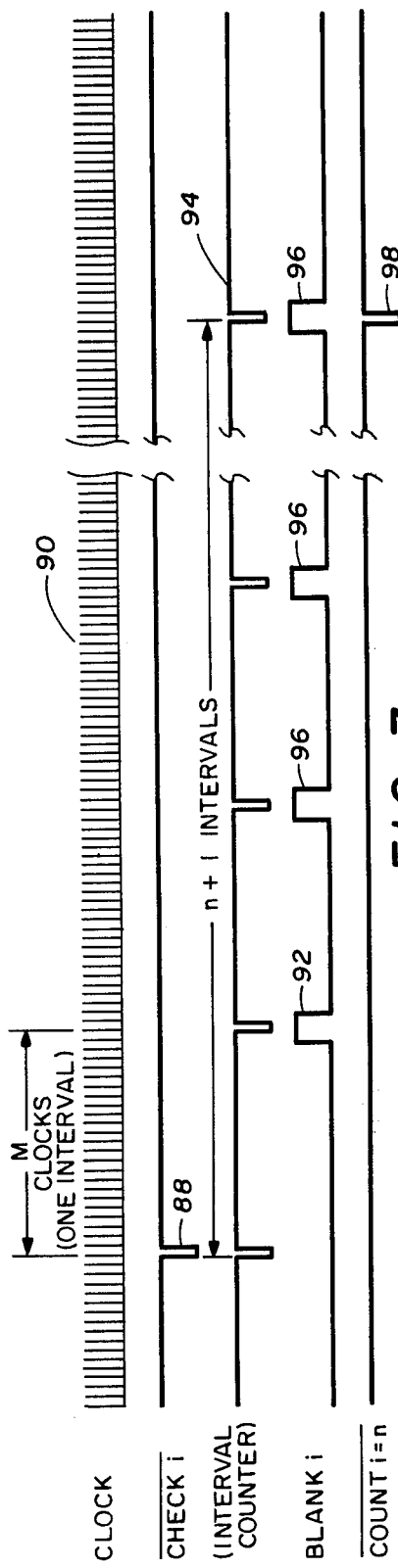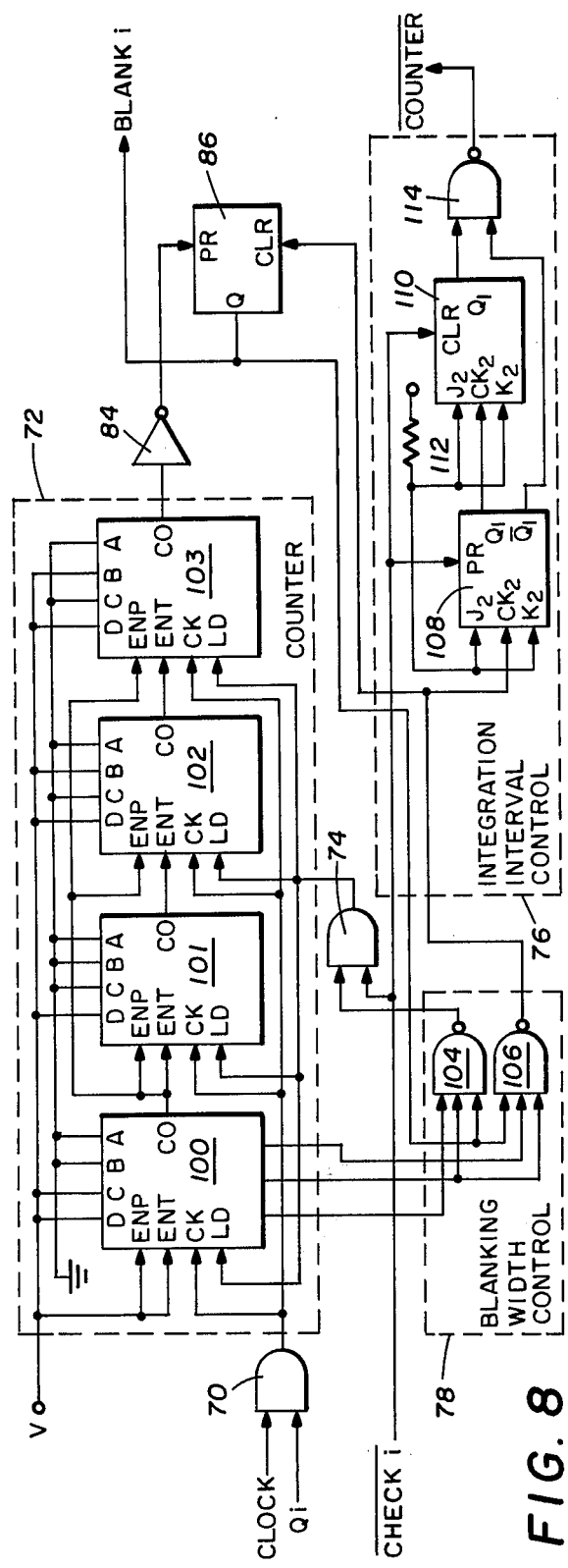

FALSE ALARM PROCESSOR

TECHNICAL FIELD

This invention relates to apparatus for acquisition of signals in a Gaussian noise environment, and more particularly to apparatus for improving the probability of detection and rejecting signal indications occurring due to false alarms.

BACKGROUND ART

Heretofore, apparatus for detection of input signals in a noise environment utilized a transversal correlator, such as a noncoherent matched filter, to compare an incoming signal against a reference. The degree of correlation between the incoming signal and the reference produces an amplitude-varying analog output signal. This output signal peaks when the incoming signal substantially matches the reference. To detect the peak condition, a threshold detector responds to the output of the transversal correlator to generate a correlation pulse.

In such systems as heretofore utilized, knowledge of the exact timing synchronization was obtained. Due to channel disturbances, the signal entering the transversal correlator often contains noise components that result in an exact but false correlation occurring at some instant in nonsynchronized time. The probability of a false correlation is a function of both the signal-to-noise ratio at the transversal correlator input and the length of the correlator, that is, the length of the noncoherent matched filter. In such presently available systems the effective signal-to-noise ratio at the correlator output is increased over that of the input signal by an amount equal to the correlator processing gain. Thus, for a given input signal-to-noise ratio and correlator length, the probability of a false alarm (false correlation) is determined solely by the setting of the threshold detector level.

Since the probability of acquisition of a valid signal is given by a Marcum Q-function (for a noncoherent matched filter correlator, with white noise), and is equal to the probability of detection, a decrease in false alarm rate (i.e., a higher threshold setting) will result in an improved probability of acquisition. Thus, systems heretofore available for acquisition of signals in a Gaussian noise environment increased the probability of acquisition by either increasing signal power, increasing correlator length (and, therefore, processing gain), or both. A principal disadvantage of such prior art systems is the limitation in flexibility of conditions of varying signal-to-noise ratio and correlator lengths.

One of the major problems associated with automatic detection systems is the difficulty of detecting true input signals as distinguished from noise which is present in a Gaussian noise environment. The high noise environments may cause serious limitations in present day acquisition systems since a high noise condition may bring about total system breakdown due to the overloading of processing circuitry. Whenever this condition occurs, even very large true signals will be rejected due to the overload caused by noise signals.

DISCLOSURE OF THE INVENTION

In accordance with the present invention, the acquisition probability for a detection circuit is improved by increasing the probability of detection and the rejection of signal indications occurring due to a noise environment. The detection circuit builds onto previously used transversal correlator and threshold detector techniques to improve the probability of acquisition independently of signal power or correlator length.

A false alarm processor of the present invention receives the output of the transversal correlator and threshold detector of a system as previously described thereby enabling a decreased threshold detector level which allows a much greater probability of detecting noise signals. Although a direct result of connecting the detection circuit of the present invention to the output of the transversal correlator and the threshold detector will be an increase in the false alarm rate, there is also present the advantage of increasing the probability of detection. By utilization of the false alarm processor of the present invention there will be an increase in the probability of acquisition by discernment between valid and false alarm correlations.

In accordance with the present invention, a circuit for processing an input signal represented by incoming pulse signal indications includes channel selection logic responsive to the incoming pulse signal indications to generate a channel assignment signal. A plurality of checking channels receive the assignment signal from the channel selection logic and the assigned channel generates a confirmation signal. Each of the checking channels includes correlation check enable logic receiving the assignment signal and generating an enable pulse for a selected channel. This enable pulse is applied to a blanking generator that generates a blanking pulse to the channel selection logic to disable this logic from generating a second channel assignment by the same incoming pulse. Confirmation logic also responds to the blanking pulse to sample the analog representation of the input signal at specific intervals and generates a confirmed signal for a valid input. Connected to each checking channel is gating logic responsive to the confirmed signal generated in any one channel to gate all such signals to an output line.

BRIEF DESCRIPTION OF DRAWINGS

A more complete understanding of the invention and its advantages will become apparent from the following description taken in conjunction with the included claims.

FIG. 7 is an illustration of the signals generated by the blanking generator and the timing sequence thereof;

FIG. 8 is a logic diagram of the blanking generator of FIG. 6 for a specific channel configuration;

DESCRIPTION OF THE PREFERRED EMBODIMENT

Figure 1:
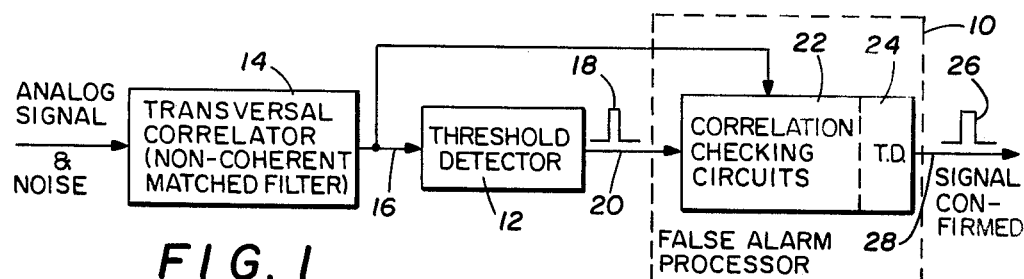
FIG. 1 is a block diagram showing the interconnection of the false alarm processor of the present invention to a signal detector comprising a transversal correlator and a threshold detector.

Referring to FIG. 1, there is shown the false alarm processor 10 of the present invention interconnected to receive a correlation pulse from a detector 12 and correlation analog signal from a transversal correlator 14. The transversal correlator 14 receives an analog input signal pulse noise, if present, and compares this incoming signal against a reference, and the degree of correlation between the two results in an amplitude varying correlation analog signal on a line 16. Typically, the transversal correlator 14 is a noncoherent matched filter of conventional design. The output of the transversal correlator 14 on the line 16 reaches a peak when the incoming signal substantially matches the reference. This analog signal, in addition to connection to the false alarm processor 10, also is input to the threshold detector 12 to generate a digital "correlation pulse" 18 on the line 20 as applied to the false alarm processor 10.

As mentioned, the input to the transversal correlator 14 is the analog input signal plus noise, typically due to general disturbances, such that the signal entering the correlator contains a noise component that may result in exact but false correlation occurring at some instant in nonsynchronized time. The probability of a false correlation pulse 18 being generated on the line 20 is a function of both the signal-to-noise ratio at the transversal correlator input and the length of the correlator, that is, the length of the matched filter. The effective signal-to-noise ratio at the correlator output is increased over that of the input by the amount of the correlator processor gain. Thus, for a given input signal-to-noise ratio at the transversal correlator 14, the probability of a false alarm (false correlation pulse 18) is determined by the setting of the threshold detector 12. Since the probability of acquisition of a true signal for a noncoherent matched filter correlation with white noise is given by a Marcum Q-function, and is equal to the probability of detection, a decrease in false alarm rate by means of a higher threshold setting in the threshold detector 12 will result in an improved probability of acquisition. Probability of acquisition is improved without limiting the possibility of the system for responding to varying signal-to-noise ratios and correlator length by interconnecting the false alarm processor 10 to the output of the threshold detector 12 and also to be responsive to the output of the transversal correlator 14.

Within the false alarm processor 10 there is included a plurality of correlation checking circuits 22 each interconnected to sample, if enabled, the correlator analog signal upon receipt of a threshold detector correlation pulse 18. The correlation pulse 18 appears at discrete times and the correlator analog signal is integrated for an established number of samples over a predetermined time interval. This integrated value is applied to a threshold detector 24 and if it exceeds the value of the threshold of the detector 24 during the sample interval, the signal is considered valid and a "signal confirmed" pulse 26 is generated on an output line 28.

Figure 2:
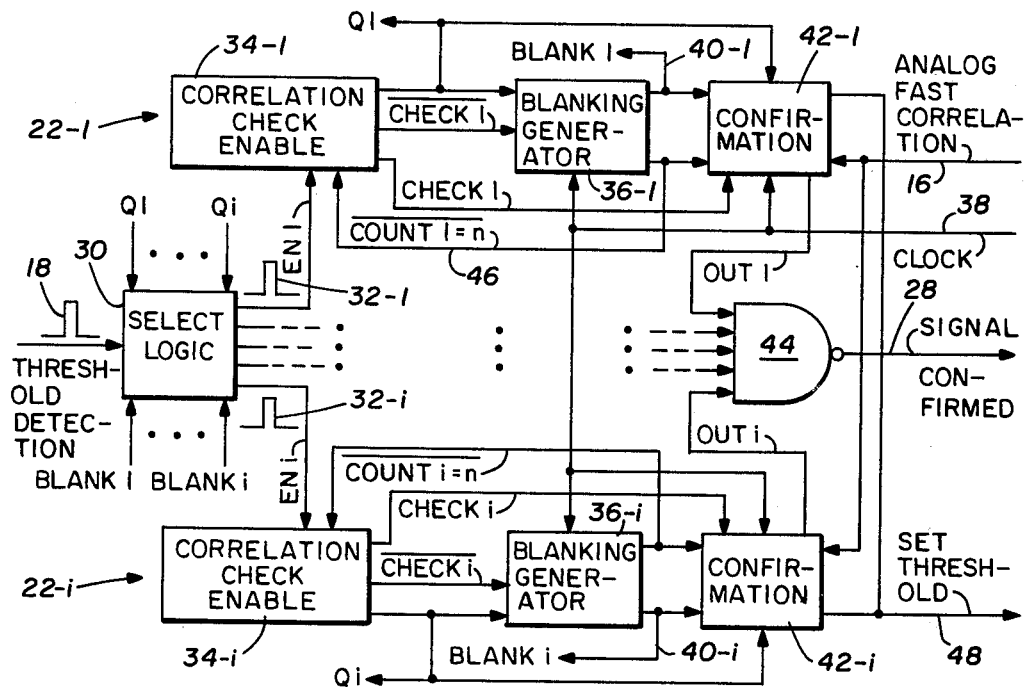
FIG. 2 is an expanded block diagram of the false alarm processor of FIG. 1 for a multichannel embodiment.

Referring to FIG. 2, there is shown an expanded block diagram of the false alarm processor 10 wherein the correlation pulse 18 is input to select logic 30 that generates a signal to assign one of the plurality of checking channels 22-1 through 22-i to be utilized in determining the validity of an input signal from the transversal correlator 14. The select logic 30 functions to generate an assignment signal to the lowest numbered checking circuit 22 that is not in use immediately prior to the occurrence of the correlation pulse 18. That is, the select logic 30 is set such that upon the occurrence of the next correlation pulse 18 an assignment signal will be generated to the next lowest numbered available checking channel 22. The select logic 30 generates the assignment signal in the form of enable pulses 32-1 through 32-i on one of the assignment lines EN1 through ENi.

Each of the correlation checking channels 22-1 through 22-i includes correlation check enable logic, such as logic 34-1 through 34-i. The correlation check enable logic 34 receives the enable pulse 32 from the assignment line to generate a disable signal check $Q_i$ and also produces the complementary pulses "check i" and "check $\overline{i}$". The check i pulse initializes a blanking generator, such as one of the blanking generators 36-1 through 36-i in the channel activated by the enable pulse 32. In addition to the check i pulse from the correlation check enable logic, the blanking generator 36 of each channel also receives the disable pulse Q and clock pulses on a clock line 38. The blanking generator 36 generates a "blanking" pulse on a line such as lines 40-1 through 40-i, connected to the select logic 30. The blanking pulse applied to the select logic 30 prevents the detection of another correlation pulse 18, resulting from the applied input signal, as being interpreted as a new signal.

The blanking pulses, "blank i", are also applied to an input of confirmation logic, such as confirmation logic 42-1 through 42-i. The blanking pulse enables the confirmation circuit to sample the energy present in the signal on the line 16, whether a true analog input signal or a noise signal, at specific intervals. Thus, the output of the transversal correlator 14 on the line 16 is sampled during each occurrence of a blanking pulse applied to the confirmation logic 42. An input signal is considered to be a true or valid signal if the integrated energy, over a selected number of sample periods, is sufficient to trigger a threshold detector as part of the confirmation logic 42. If a valid signal occurs, a "signal confirmed" signal is generated and gated through a NAND gate 44 to the output line 28.

Also generated by the blanking generator 36 is a sample count signal "count i=n" that is applied to the confirmation circuit 42 and also to the correlation check enable logic 36 over a line 46. After the preselected number of samples of the input signal the count i=n pulse on the line 46 enables the correlation check enable logic 36 to be available for reassignment upon occurrence of the next correlation pulse 18 for a subsequent analog input signal to the transversal correlator 14.

In operation of the signal analyzing circuit of FIG. 1 with the false alarm processor 10 of FIG. 2 if the integrated value of the output of the transversal correlator 14 exceeds the threshold of the detector of the confirmation logic 42, then the signal is considered valid and the "signal confirmed" pulse is generated on the line 28. The increase in probability of acquisition of a valid signal is determined by the number of signal energy samples taken and the threshold setting of the detector of the confirmation logic 42. The setting of the threshold detector of the confirmation logic 42 is determined by a voltage applied to a line 48.

In general, if the false alarm probability is $P_f$, then the probability of detection of a valid signal by the confirmation logic 42 is:

$$P_{ACQ} = P_{D2} = (1 - P_f{}^n), \qquad (1)$$

where n = the number of samples taken, and assuming that ∫[n white noise samples] is less than the threshold setting on the line 48.

By the signal processor of FIG. 1 the improvement in the probability of acquisition is given by the expression:

$$P_{D2} - P_{d1} = (1 - P_f{}^n) - (1 - P_f) = P_f - P_f{}^n, \qquad (2)$$

If Pf is a relative large number, a significant improvement will be noticed.

Figure 3:
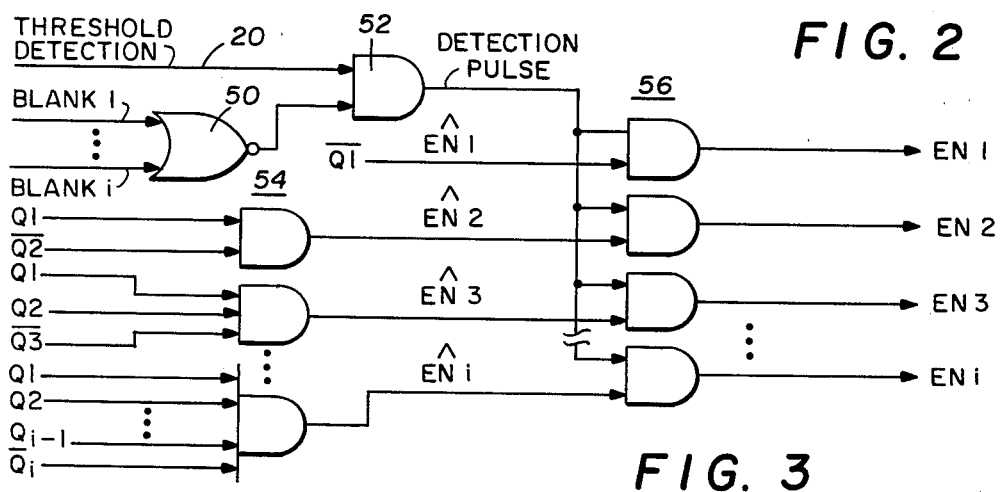
FIG. 3 is a logic diagram of the channel selection logic of the correlation checking circuit of FIG. 2.

Referring to FIG. 3, there is shown a logic diagram for the select logic 30 that comprises a NOR gate 50, an AND gate 52 and an array of AND gates 54 and 56. The NOR gate 50 has a number of input lines equal to the number of correlation checking channels 22. The input connected to the NOR gate 50 is the blanking pulse from the generator 36 on the line 40. The output of the NOR gate 50 is applied to the input of the AND gate 52 which also is coupled to the line 20 from the threshold detector 12 to receive the correlation pulse 18. The output of the AND gate 52 is the assignment pulse applied to one input at each of the AND gates in the array 56. A second input to each of the AND gates of the array 56 is a channel selection signal to enable one of the correlation checking channels 22.

Except for the AND gate in the array 56 assigned to the correlation checking channel 22-1 the second signal to each of the other AND gates in the array 56 is output from one of the AND gates of the array 54. The number of inputs connected to each of the AND gates in the array 54 increases in direct number to the channel to which it is identified. That is, the AND gate in the array 54 for the channel checking channel 22-2 has input thereto the $Q_1$ and $\overline{Q}_2$ pulses from the correlation checking enable logic 34-1 and 34-2. For the AND gate of the array 54 associated with the channel checking channel 22-3 there are three inputs from the correlation checking enable circuit of each of three channels 22-1, 22-2 and 22-3. The number of inputs to each of the AND gates in the array 54 increases as the channel number increases.

By operation of the select logic 30 only one of the assignment lines, EN1 through ENi will be put in the enable condition upon the occurrence of a correlation pulse 18 on a line 20 to the AND gate 52. The select logic 30 will, in essence, multiplex the correlation pulse 18 onto the lowest ordered unused assignment line. This allows the assignment line EN1 to have the highest assignment priority, the assignment line EN2 to have the next highest assignment priority with the assignment line ENi having the lowest assignment priority.

When any of the correlation checking channels 22 are not in use the disable signal Q is at a logic low level and the assignment lines ENj through ENi are disabled. Likewise, a particular channel is enabled only when channels 22-1 through 22-(j−1) are in use as indicated by the disable signals $Q_1$ through $Q_{j-1}$ at a logic high level.

Figure 4:
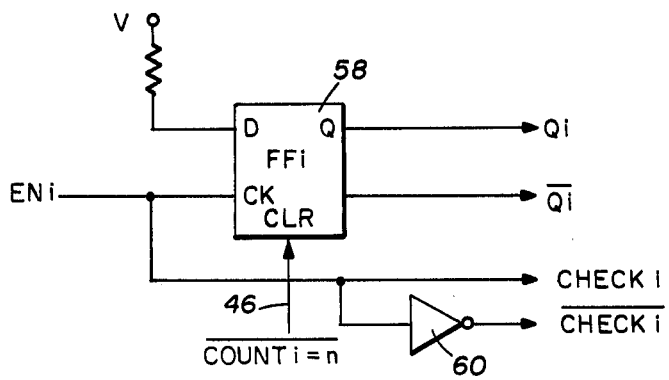
FIG. 4 is a logic diagram of the correlation check enable logic of the correlation checking circuit.

Referring to FIG. 4, there is shown a logic diagram of the correlation check enable logic 34 for each of the correlation checking channels 22. The enable pulse 32 on the assignment line ENi is applied to the clock input of a flip-flop 58 having a clear terminal connected to receive the pulse $\overline{\text{count } i=n}$ of a line 46. The flip-flop 58 is set to logic high at the occurrence of the enable pulse on the assignment line ENi and is reset by the pulse count i=n stepping to logic low on the line 46. The outputs of the flip-flop 58 are the disable pulses $Q_i$ and $\overline{Q}_i$ connected to the logic of FIG. 3.

Also forming part of the correlation check enable logic 34 is an inverter amplifier 60 having an input connected to the assignment line ENi and generating the pulse $\overline{\text{check } i}$ connected to the blanking generator 36. Also output from the correlator check enable logic 34 is the pulse cleck i applied to the confirmation logic 42 which signal follows the enable pulse 32 to enable the confirmation logic.

Figure 5:
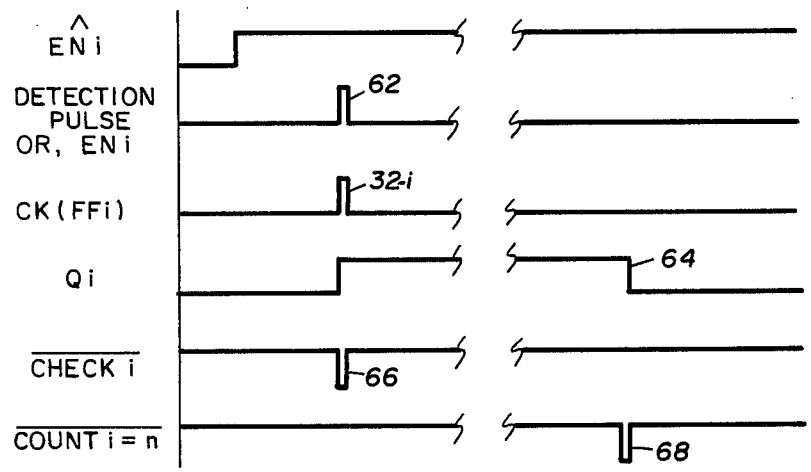
FIG. 5 is a series of waveforms illustrating signals and timing sequences for the correlation check enable logic.

Referring to FIG. 5, there is shown a timing chart illustrating the operation of the correlation check enable logic 34. Whenever the logic enable signal ENi for any channel applied to the respective AND gate of the array 56 steps from logic low to logic high that particular AND gate is enabled for generating the enable pulse 32. At the next occurrence of a correlation pulse 18 at the output of the threshold detector 12, as indicated by the pulse 62, an enable pulse 32i is generated to clock the flip-flop 58. The Q output of the flip-flop 58 steps from logic low to logic high as indicated by the waveform 64. This disables the assigned channel from receiving further enable pulses.

The enable pulse applied to the CK terminal of the flip-flop 58 is also applied to the inverter amplifier 60 to generate the pulse $\overline{\text{check } i}$ 66 to enable the blanking generator 36. The assigned channel functions to evaluate for a valid incoming signal as previously explained until the blanking generator 36 outputs the pulse $\overline{\text{count}}$ $\overline{i=n}$ on the line 46 as shown by the waveform 68. Generation of the pulse 68 clears the flip-flop 58 to step the Q terminal of the flip-flop from logic high to logic low. The particular channel is now reenabled to accept another assignment for checking the validity of an incoming signal. Thus, the correlation check enable logic 34 for each of the channels receives and generates pulse signals in the time sequence illustrated in FIG. 5.

Figure 6:
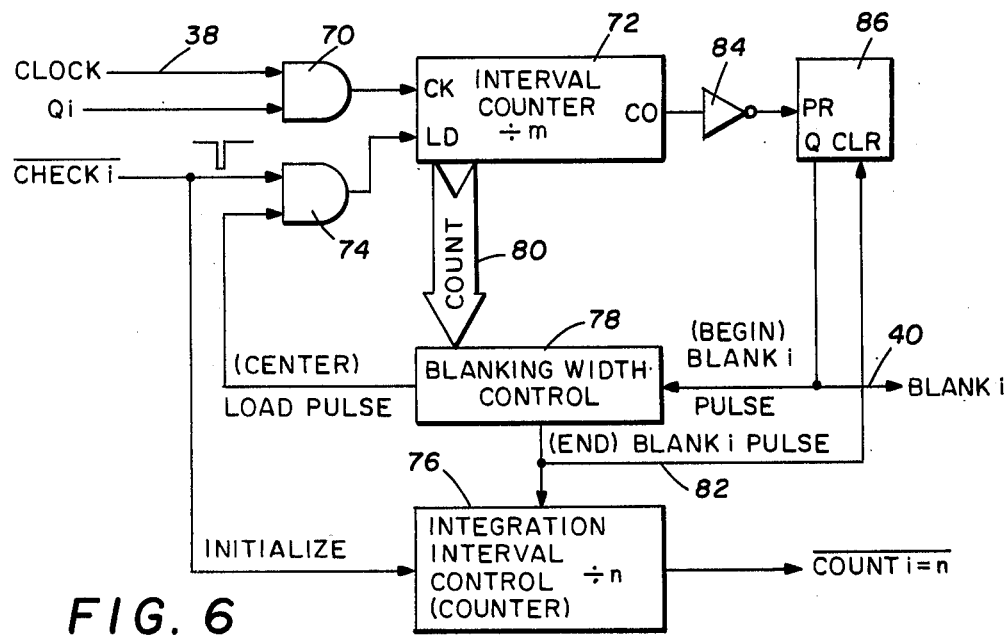
FIG. 6 is a generalized block diagram of the blanking generator of the correlation checking circuit for each channel thereof.

Referring to FIG. 6, there is shown a generalized block diagram for the blanking generator 36 of one of the channels 22. Clock pulses on the line 38 and the enable pulse from the flip-flop 58 are applied to individual inputs of an AND gate 70. An output of the AND gate 70 is connected to the clock input of a divide-by-m interval counter 72. A second input to the interval counter 72 is the output of an AND gate 74 that has one input connected to receive the pulse $\overline{\text{check i}}$ from the output of the inverter 60. This pulse is also applied as an initializing signal to a divide-by-n integration interval control counter 76. A second input to the AND gate 74 is a load pulse generated at the output of a blanking width controller 78. The controller 78 receives counting information bits over connecting lines 80 from the divide-by-m interval counter 72. Also output from the controller 78 is the pulse (END) blank i applied over a line 82 to the integration interval controller counter 76.

An output of the interval counter 72 is applied through an inverter amplifier 84 to an input of a flip-flop 86 that is also connected to the line 82 at the clear terminal. The output of the flip-flop 86 at the Q terminal is the pulse (BEGIN) blank i generated on the line 40 as connected to the confirmation logic 42 and also input to the blanking width controller 78.

In operation of the blanking generator of FIG. 6, when the pulse check i occurs at the input of the AND gate 74 it presets the divide-by-m interval counter 72 and initializes the integration control counter 76. With reference to FIG. 7, the pulse check i is illustrated at 88 which is coupled to the interval counter 72 along with the clock pulses 90 at the output of the AND gate 70. Thus, the interval counter 72 is preset initially by the pulse check i and counts for a preselected number of clock pulses before generating a signal at the CO terminal that is applied through the inverter amplifier 84 to the flip-flop 86. This generates the pulse (BEGIN) blank i (pulse 92 in FIG. 7) applied on the line 40 to the confirmation logic 42 and also to the blanking width controller 78.

Also input to the blanking width controller 78 are clock pulses from the interval counter 72. For each preselected number of clock pulses the blanking width controller 78 generates a load pulse applied to the AND gate 74. The AND gate 74 provides an output as illustrated by the waveform 94 to the interval counter 72. For each pulse applied to the counter 72 from the AND gate 74 the flip-flop 86 generates another pulse blank i (illustrated as pulses 96 in FIG. 7). This operation continues until the pulse (END) blank i is generated on the line 82 at the output of the blanking width controller 78.

The integration interval control counter 76 will reach a count value of (n) on the nth blank i pulse occurring after the pulse check i first applied to the AND gate 74. After an interval of (n+1) the last of the pulse blank i is generated at the output of the flip-flop 86 to trigger the integration interval controller 76 to generate the pulse count i=n (as illustrated by the pulse 98). This ends the integration interval of the confirmation logic 42 and resets the particular correlation channel for a subsequent assignment.

Referring to FIG. 8, there is shown a detailed circuit diagram for the blanking generator 36 where the divide-by-m interval counter has a divide factor of 22,000 and the integration interval control counter 76 has a divide factor of 3, and the blanking width controller 78 operates for six clock periods as shown by the waveform 94 of FIG. 7. Like reference numerals are used in FIG. 8 for the same elements as appearing in FIG. 6. The clock pulses 90 and the enable pulse $Q_i$ from the correlation check enable logic 34 are input to the AND gate 70 having an output connected to the clock terminal of counters 100 through 103 as part of the interval counter 72. Each of the counters is interconnected at the load terminal to the output of the AND gate 74. The counters 100 through 103 are cascaded and provide an output at the CO terminal of the counter 103 which is applied through the inverter amplifier 84 to the counter 86.

Connected to the $Q_a$ terminal of the counter 100 is an AND gate 104 as part of the blanking width controller 78. Also connected to the AND gate 104 is the output at the $Q_b$ terminal of the counter 100 which also connects to one input of an AND gate 106. A second input to the AND gate 106 connects to the $Q_c$ terminal of the counter 100 and a third terminal interconnects to the Q terminal of the flip-flop 86 which is also connected to the AND gate 104. The output of the AND gate 104 is the load pulse that is input to the AND gate 74. A second input to the AND gate 74 is the pulse check i which is also applied to flip-flops 108 and 110 of the integration interval controller 76.

The J and K terminals of the flip-flops 108 and 110 are interconnected to a voltage supply through a resistor 112. The clock terminal of the flip-flop 108 is interconnected to the output of the AND gate 106 which also connects to the clear terminal of the flip-flop 86. A signal on the Q terminal of the flip-flop 108 clocks the flip-flop 110 and the $\overline{Q}$ terminal connects to an AND gate 114 which is also connected to the Q terminal of the flip-flop 110. The output of the AND gate 114 is the pulse count i=n applied to the correlation check enable logic 34.

Utilizing the circuit of FIG. 8 for the blanking generator 36 one interval is represented by 22,000 clock pulses, that is, the interval between pulses of the waveform 94 represents a time displacement of 22,000 clock pulses. The number of intervals for the circuit of FIG. 8 is four, that is, n=3 in the expression n+1 of the waveform 94.

Figure 9:
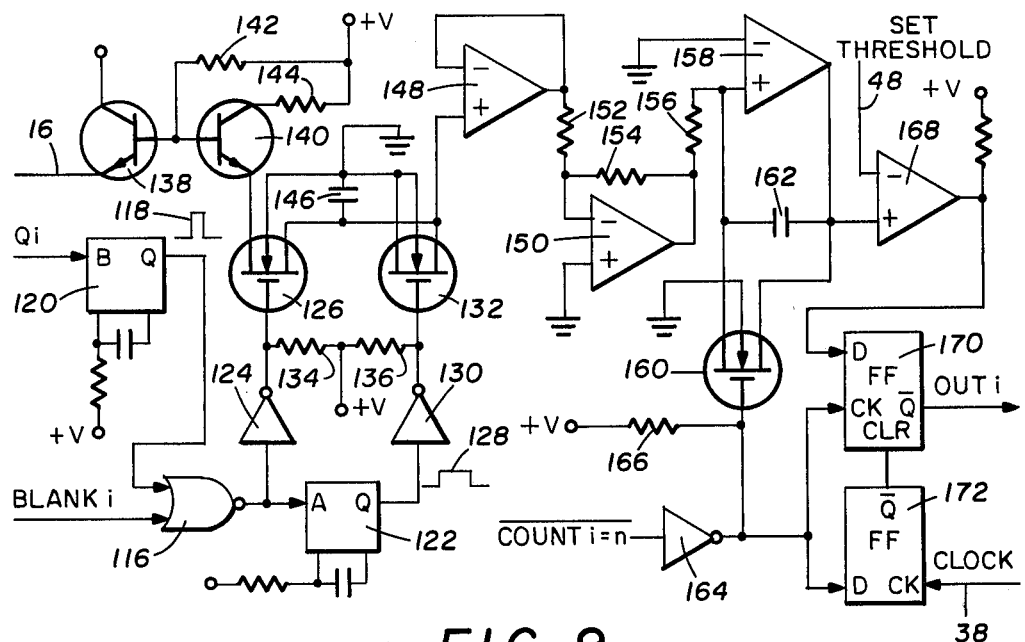
FIG. 9 is a logic diagram of the confirmation signal generator of the correlation checking circuit for sampling the energy of an input signal over a specific time interval.

Referring to FIG. 9, there is shown a circuit diagram of the confirmation logic 42 wherein the pulse blank i from the flip-flop 86 is input to a NOR gate 116. A second input to the NOR gate 116 is a pulse 118 output from a one-shot 120 that receives the enable pulse $Q_i$. The one-shot 120 functions as a one-shot multivibrator that generates an output that is applied to the NOR gate 116 to generate a negative output pulse applied to a one-shot 122 that also functions as a one-shot multivibrator.

The output of the NOR gate 116 is also inverted in an inverter amplifier 124 and applied as a positive pulse to the gate of a transistor switch 126. The output pulse of the one-shot 122 (as illustrated by a waveform 128) is inverted in an amplifier 130 and applied as a negative pulse to the gate of a transistor switch 132. The gate electrodes of the transistor switches 126 and 132 are interconnected to a positive voltage supply by means of resistors 134 and 136, respectively. With this interconnection the occurrence of a negative pulse at the output of the NOR gate 116 turns on the transistor switch 126 and the transistor switch 132 is turned off.

Also input to the circuitry of FIG. 9 is the analog input (incoming signal) on the line 16 connected to the emitter electrode of a transistor 138. The transistor 138 is part of a transistor pair including a transistor 140 that has a common base electrode connection with the transistor 138. The common base electrode interconnection of the transistors 138 and 140 is biased through a resistor 142 connected to a positive voltage supply. Also connected to the positive voltage supply is a resistor 144 for controlling the current flow through the resistor 140. The emitter electrode of the transistor 140 connects to the transistor switch 126.

Connected to the transistor switches 126 and 132 is a charging capacitor 146 that is also connected to the noninverting input terminal of an amplifier 148 which amplifies the voltage appearing across the capacitor. The output of the amplifier 148 is applied to the inverting input terminal of an amplifier 150 through a resistor 152. The amplifier 150 includes a feedback network 154 and further amplifies the voltage on the capacitor 146. The output of the amplifier 150 is applied through a resistor 156 to one input of an amplifier 158 and to one terminal of a transistor switch 160. Connected in a feedback loop across the amplifier 158 is a charging capacitor 162 that is controllably shunted by operation of the transistor switch 160 which also connects to the output of the amplifier 158. The transistor switch 160 has a gate electrode connected through an inverting amplifier 164 to receive the pulse count i=n from the integration interval controller 76. Also connected to the gate of the transistor switch 160 is a biasing resistor 166.

The output of the amplifier 158 is applied to one input of an amplifier 168 that has a second input connected to the line 48. Applied to the line 48 is the threshold voltage for one test in validating the input signal on the line 16. The output of the amplifier 168 is applied to the D terminal of a flip-flop 170 that is clocked by the pulse count i=n at the output of the inverter amplifier 164. The output of the flip-flop 170 is the confirmed signal applied to the gate 44 of FIG. 2.

When the integration interval of the confirmation logic 22 is complete the flip-flop 170 is cleared by the output of a flip-flop 172 that has the D terminal connected to receive the pulse count i=n at the output of the inverter amplifier 164. Connected to the clock input of the flip-flop 172 is the clock pulse on the line 38.

The integrating circuit formed by resistor 156, capacitor 162 and the amplifier 158 permits the voltage across the capacitor 162 to increase by an amount equal to the voltage across the capacitor 146 during each sample period when the pulse 128 is generated at the output of the one-shot 122. The voltage across the capacitor 162 appears at the positive input of the amplifier 168 and if at any time during the integration interval this voltage increases above the threshold voltage set on the line 48 the D terminal of the flip-flop 170 steps high as indicated by the waveform pulse 192. At the end of the integration interval as indicated by the negative step to the waveform 174 the pulse count i=n steps logic low and the flip-flop 170 is set to the value appearing at the D terminal input. The next clock pulse appearing on the line 38 sets the output of the flip-flop 132 to a logic low thereby clearing the flip-flop 170 for the next integration interval. Voltage samples are taken each time a negative pulse appears at the output of the NOR gate 116 and are thus controlled by the occurrence of the pulse blank i from the flip-flop 86.

Figure 10:
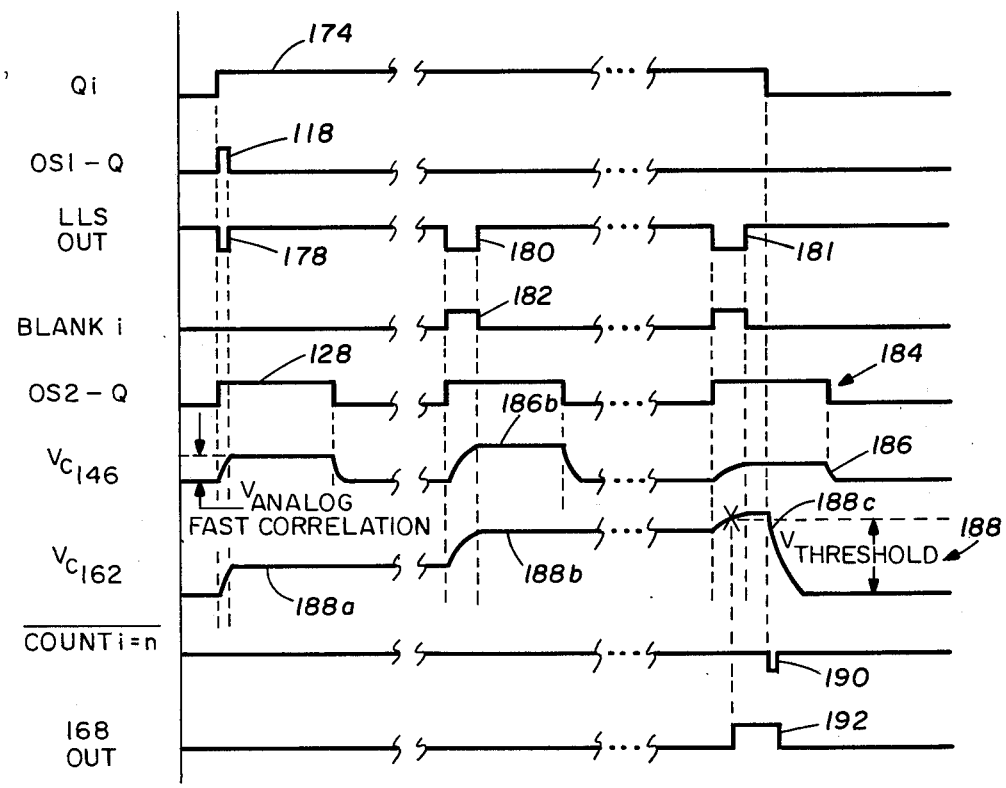
FIG. 10 is an illustration of the signals generated by the circuit of FIG. 9 showing the timing sequence thereof.

In operation of the confirmation logic of FIG. 9 and with reference to the timing diagram of FIG. 10, circuit operation is initialized on the positive transition of the enable pulse $Q_i$ (as illustrated by the waveform 174) that generates a positive pulse (pulse 118) at the Q output of the one-shot 120, a negative pulse (pulse 178) at the output of the NOR gate 116 and a positive pulse applied to the gate of the transistor switch 126 of the inverter amplifier 124. The negative transition of the pulse 118 also triggers the one-shot 122 to generate the pulse 128 and a negative output from the amplifier 130 to turn off the transistor switch 132.

The analog input signal applied over the line 16 to the transistor 138 causes this transistor to turn on which in turn turns on the transistor 140 and the capacitor 146 begins to charge through the previously turned on transistor switch 126. So long as the transistor switch 132 is in an off state, the charge will continue to increase on the capacitor 146. After a short time interval (approximately 200 microseconds), as indicated by the width of the pulse 128, the output of the amplifier 130 goes positive thereby turning on the transistor switch 132. This causes the capacitor 146 to discharge through the now conducting transistor switch 132.

During the charging cycle of the capacitor 146 the voltage across this capacitor is amplified through the amplifiers 148 and 150 and applied to the input of the amplifier 158 causing a charge to build up on the capacitor 162 as indicated at 188a of the waveform 188. Since at this time the pulse count i=n is at a logic high the output of the amplifier 164 is negative thereby causing the transistor switch 160 to be in an off condition. The charge build up on the capacitor 162 will be retained as indicated by the portion 188a of the waveform 188 until the pulse count i=n steps to a logic low level.

At the next sample interval as indicated by the pulse 180 of FIG. 10 the capacitor 146 will again be charged, as indicated by the portion 186b of the waveform 186 so long as the transistor switch 132 is in an off state. The cycle repeats itself with the charge on the capacitor 146 again applied to the capacitor 162 through the amplifiers 148 and 150 until the transistor switch 132 turns on in response to the output of the one-shot 122 stepping negative. The charge on the capacitor 162 now increases to a second level as indicated by the portion 188b of the waveform 188. At the third sampling interval as indicated by the waveform pulse 181 the cycle repeats for a third time again increasing the charge in the capacitor 162.

As indicated in FIG. 10, as a result of this third sampling interval the voltage on the capacitor 162 increases above the threshold as applied to the amplifier 168 thereby causing the output to step to a logic high as indicated by the waveform pulse 192. This triggers the flip-flop 170 to generate the signal confirmed output to the NAND gate 44.

At the end of the third sampling interval the pulse count i=n steps negative as indicated by the waveform pulse 190 thereby turning on the transistor switch 160 and discharging the capacitor 162 to the original level. This discharge of the capacitor 162 is indicated by the portion 188c of the waveform 188. At this time the channel is reenabled to be assigned another input for signal confirmation.

If the charge on the capacitor 162 does not exceed the threshold as set at the amplifier 168 before the occurrence of the pulse 190 the output of the amplifier 168 will remain at a logic low level. This is an indication that the integrated energy of the input signal is not sufficient to be a valid input and the signal confirmed output will not be generated. Thus, only for valid input signals will the charge on the capacitor 162 exceed the threshold level set in the amplifier 168.

While only one embodiment of the invention, together with modifications thereof, has been described in detail herein and shown in the accompanying drawings, it will be evident that various further modifications are possible without departing from the scope of the invention.

We claim:

1. A circuit for processing an input signal represented by pulse signals, comprising in combination:
   channel selection means responsive to a pulse signal and generating a channel assignment signal,
   a plurality of checking channels receiving an assignment signal from said channel selection means and generating a confirmation signal, each of said checking channels including:
   enable means for receiving the assignment signal and generating an enable signal for a selected checking channel,
   a blanking generator responsive to the enable signal to apply a blanking pulse to said channel selection means to disable said channel selection means from generating a second channel assignment signal for the same pulse signal, and means responsive to the blanking pulse to sample the input signal at specific intervals and generating a confirmed signal for a valid input, and means responsive to the confirmed signal generated at any one channel to gate the confirmed signal to an output line.

2. A circuit for processing an input signal as set forth in claim 1 wherein said channel selection means includes means for multiplexing the pulse signal to the input of the lowest numbered unused one of said checking channels.

3. A circuit for processing an input signal as set forth in claim 2 wherein said channel selection means further includes gating responsive to an enable pulse from said means for receiving for each said checking channel to generate a channel in use signal to said means for multiplexing.

4. A circuit for processing an input signal as set forth in claim 1 wherein said channel selection means includes gating logic for multiplexing the pulse signal to the lowest numbered unused one of said checking channels and responsive to the enable pulse of the means for receiving from each said checking channel to generate a channel in use signal to said logic for multiplexing.

5. A circuit for processing an input signal as set forth in claim 1 wherein said means for receiving in each of said checking channels includes means for generating a channel in use signal and the assignment signal.

6. A circuit for processing an input signal as set forth in claim 1 wherein said blanking generator includes means for controlling the time interval between subsequent blanking pulses, means for controlling the width of each blanking pulse, and means for controlling the number of blanking pulses in a time interval.

7. A circuit for processing an input signal as set forth in claim 6 wherein said means for controlling the interval between subsequent blanking pulses includes a counter responsive to an externally generated clock signal and the channel assignment signal.

8. A circuit for processing an input signal as set forth in claim 7 wherein said means for controlling the number of blanking pulses in a specific time interval includes an integration interval counter.

9. A circuit for processing an input signal as set forth in claim 1 wherein said means responsive to the blanking pulse in each of said checking channels includes means for integrating the energy of the input signal over a preselected number of sample periods for triggering said means for generating the confirmed signal.

10. A circuit for processing an input signal as set forth in claim 9 wherein said means for generating the confirmed signal includes a threshold detector responsive to the energy level of an input signal in excess of a threshold level.

11. A circuit for processing an input signal as set forth in claim 1 wherein said means responsive to the blanking pulse includes means for generating a channel reassignment signal to said channel selection means.

12. A signal processing channel in a circuit for processing an input signal represented by pulse signal indications, comprising in combination:

a correlation detector responsive to an enable signal for generating a channel enable pulse, a blanking generator responsive to the channel enable pulse to generate sample interval pulse, and means responsive to the sample interval pulses and connected to receive the input signal to sample the input signal at specified intervals and generate a confirmed signal for a valid input.

13. A signal processing channel as set forth in claim 12 wherein said means responsive to the sample interval pulse includes means for integrating the energy of the input signal for a specified number of sample interval pulses to generate the confirmed signal.

14. A signal processing channel as set forth in claim 13 wherein said means responsive to the sample interval pulse further includes a threshold detector connected to said means for integrating, said threshold detector triggered to generate the confirmed signal when the energy level of the input signal for a specified number of sample interval pulses exceeds a threshold limit.

15. A signal processing channel as set forth in claim 12 wherein said blanking generator includes:

a first counter for generating the time interval between adjacent sample interval pulses, a second counter for generating a preselected number of sample interval pulses for a sample period, and means for controlling the time duration of each sample interval pulse.

16. A signal processing channel as set forth in claim 15 wherein said second counter includes logic for generating integration interval signals.

17. A processor for an analog input signal, comprising in combination:

a transversal correlator responsive to the analog input signal for generating a correlated processing signal, a threshold detector connected to said correlator to receive the processing signal and generate a correlation pulse, channel selection means responsive to the correlation pulse and generating a channel assignment signal, a plurality of checking channels receiving an assignment signal from said channel selection means and generating a confirmation signal, each of said checking channels including:

enable means for receiving the assignment signal and generating an enable signal for a selected channel, a blanking generator responsive to the enable signal to apply a blanking pulse to said channel selection means to disable said means from generating a second channel assignment signal for the same correlation pulse, and means responsive to the blanking pulse to sample the input signal at specific intervals for generating a confirmed signal for a valid input, and means responsive to the confirmed signal generated at any one channel to gate the confirmed signal to an output line.

18. A processor for an analog input signal as set forth in claim 17 wherein said channel selection means includes means for multiplexing the processing signal as the assignment signal to the input of the lowest numbered unused one of said checking channels, and means responsive to the enable pulse to generate a channel in use signal to said means for multiplexing.

* * * * *